Patented Mar. 21, 1933

1,902,143

UNITED STATES PATENT OFFICE

FRANK SALADINO, JOSEPH SALADINO, AND SALVATORE SALADINO, OF CHELSEA, MASSACHUSETTS, ASSIGNORS TO C. SALADINO & SONS, INC., OF CHELSEA, MASSACHUSETTS, A CORPORATION

COMPOSITION FOR TREATING STRINGS

No Drawing. Application filed January 20, 1931. Serial No. 510,056.

This invention relates to a composition for treating strings, and more especially for gut, silk or fiber strings used in tennis rackets, musical instruments, surgical sutures and the like.

Inasmuch as strings used in tennis rackets and the like are exposed to damp weather—sometimes being used even in the rain—and are affected by climatic conditions, it has been our object to compound a formula to treat the strands forming the strings, whether consisting of gut, fiber or silk, or a combination thereof, so as to make them moisture proof. Another object in the achievement of this composition has been to include ingredients which will impart adhesive qualities to said strands, thereby making it possible to make a firmer string by twisting the strands tighter than heretofore.

Another object in providing such a composition is to make it possible to give the finished strings a glossy finish. Still another constant object has been to make our composition at low cost by including only such ingredients and in such proportions as will enable us to attain this end.

In our composition we use water, gelatine, red beef oil distilled (which is one kind of oleic acid obtained from beef as by distillation), glycerine, and tallow oil, and it is preferably prepared in proportions and by steps as follows:

Three pounds of gelatine in one gallon of water are cooked to a temperature of approximately 200 degrees Fahrenheit, then one ounce of red beef oil distilled is added and thoroughly stirred in, after which five ounces of glycerine (glycerine for commercial purposes is suitable) are added and stirred in, followed by adding five ounces of tallow oil and again stirring, keeping the temperature at approximately 200 degrees Fahrenheit while adding these various ingredients. If coloring is desired it should be added next and stirred in, using a water dye of the desired color such as blue, red, etc., and maintain said temperature.

Our composition is now ready to have the strands, either gut, silk or fiber dipped in it, the temperature being maintained at about 200 degrees Fahrenheit while the dipping takes place.

In conclusion, it will be understood that various changes may be made in the ingredients and proportions specified without departing from the spirit and scope of our invention, hence we do not intend to be limited to details hereinbefore described except as they may be specifically included in the claims.

What we claim is:

1. The method of preparing a composition for treating strings comprising in major part three pounds of gelatine to one gallon of water cooked until said gelatine and water reach a temperature of approximately 200 degrees Fahrenheit, which comprises adding thereto and stirring in red beef oil distilled, then adding and stirring in glycerine and then adding and stirring in tallow oil, maintaining a continuous temperature of approximately 200 degrees Fahrenheit during the preparation of said composition.

2. The method of preparing a composition for treating strings comprising in the following proportions three pounds of gelatine to one gallon of water, one ounce of red beef oil distilled, five ounces of glycerine and five ounces of tallow oil, which comprises cooking said gelatine and water together until a temperature of 200 degrees Fahrenheit is reached, then adding and stirring in said red beef oil distilled, then adding and stirring in said glycerine, and then adding and stirring in said tallow oil, maintaining a constant temperature of approximately 200 degrees Fahrenheit all the while.

3. The method of preparing a composition for treating strings comprising in the following proportions three pounds of gelatine to one gallon of water, one ounce of red beef oil distilled, five ounces of glycerine, five ounces of tallow oil and a water color dye, which comprises cooking said gelatine and water together until a temperature of approximately 200 degrees Fahrenheit is reached, then adding and stirring in said red beef oil distilled, then adding and stirring in said glycerine, then adding and stirring in said tallow oil, and then adding and stirring in said water color dye, maintaining a constant temperature of 200 degrees Fahrenheit all the while.

4. The method of preparing a composition comprising water, gelatine, red beef oil distilled, glycerine and tallow oil which comprises cooking said water and gelatine together until it reaches a temperature of approximately 200 degrees Fahrenheit, then adding and stirring in red beef oil, then adding and stirring in glycerine, and then adding and stirring in tallow oil, maintaining said temperature constantly during the preparation of said composition.

5. The method of preparing a composition comprising water, gelatine, red beef oil distilled, glycerine and tallow oil and a water dye for coloring, which comprises cooking said water and gelatine together until it reaches a temperature of approximately 200 degrees Fahrenheit, then adding and stirring in red beef oil, then adding and stirring in glycerine, then adding and stirring in tallow oil, and then adding and stirring in said water dye, maintaining said temperature constantly during the preparation of said composition.

6. A composition comprising water, gelatine, red beef oil, glycerine and tallow oil.

7. A composition for treating strings comprising water, gelatine, red beef oil distilled, glycerine and tallow oil in the following proportions: one gallon of water, three pounds of gelatine, one ounce of red beef oil distilled, five ounces of glycerine, and five ounces of tallow oil.

8. A composition for treating strings comprising water, gelatine, red beef oil distilled, glycerine and tallow oil in the following proportions: one gallon of water, three pounds of gelatine, one ounce of red beef oil distilled, five ounces of glycerine, five ounces of tallow oil, and water dye for coloring purposes.

9. A composition for treating strings artificially heated to a temperature of approximately 200 degrees Fahrenheit, comprising to one gallon of water, three pounds of gelatine, one ounce of red beef oil distilled, five ounces of glycerine and five ounces of tallow oil.

10. A composition for treating strings comprising in proportion three pounds of gelatine to one gallon of water, glycerine and tallow oil in approximately equal proportions and of less weight than said gelatine, and beef oil of less weight than either said glycerine or tallow oil.

11. A composition comprising in major part three pounds of gelatine to one gallon of water, and in minor part red beef oil distilled, glycerine and tallow oil.

FRANK SALADINO.
JOSEPH SALADINO.
SALVATORE SALADINO.